Aug. 23, 1927.
E. F. HARTZELL
1,639,942
SPRING COVER, SPRING SLEEVE, AND LUBRICATOR
Filed Oct. 18, 1926   4 Sheets-Sheet 2
Fig. 4.
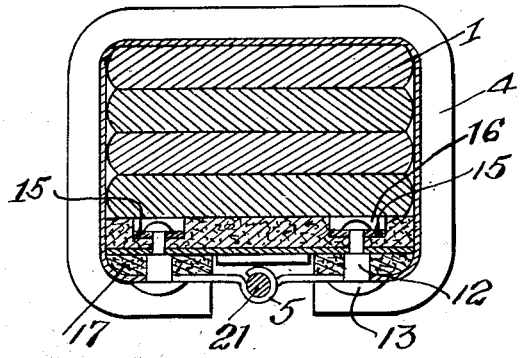
Fig. 5.
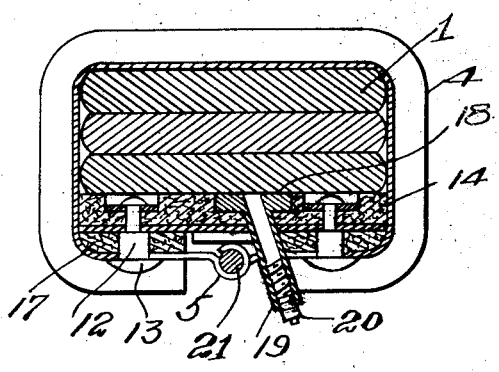
Fig. 6.
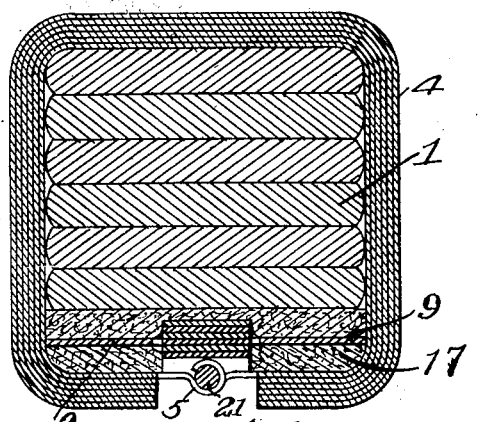
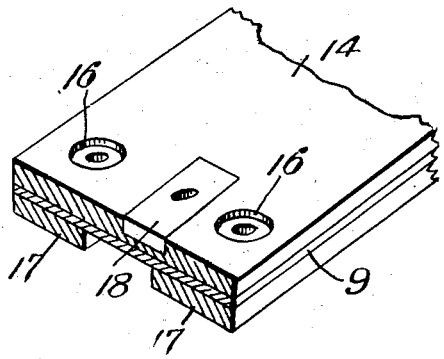
Fig. 8.
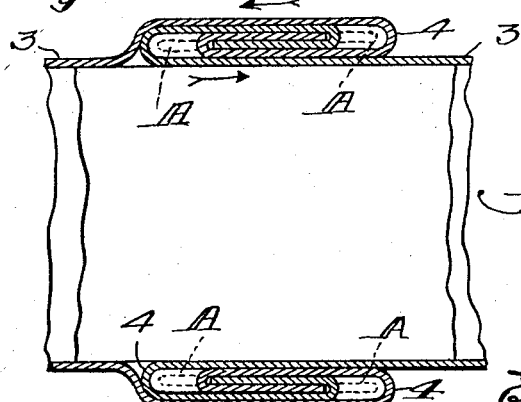
Fig. 7.
INVENTOR.
E. F. Hartzell
BY
E. G. Vrooman & Co.
his ATTORNEYS.

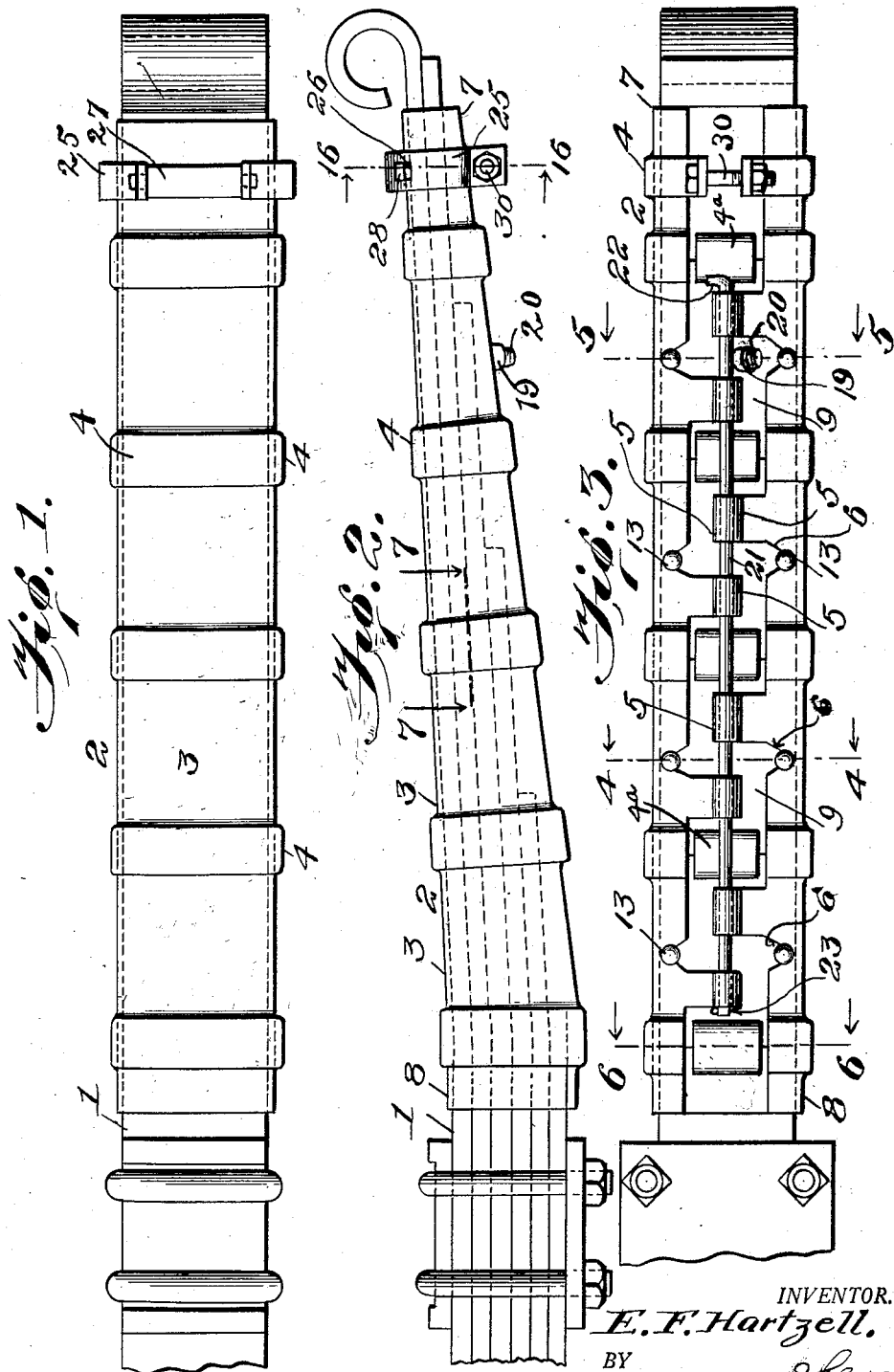

Aug. 23, 1927.
E. F. HARTZELL
1,639,942
SPRING COVER, SPRING SLEEVE, AND LUBRICATOR
Filed Oct. 18, 1926
4 Sheets-Sheet 3
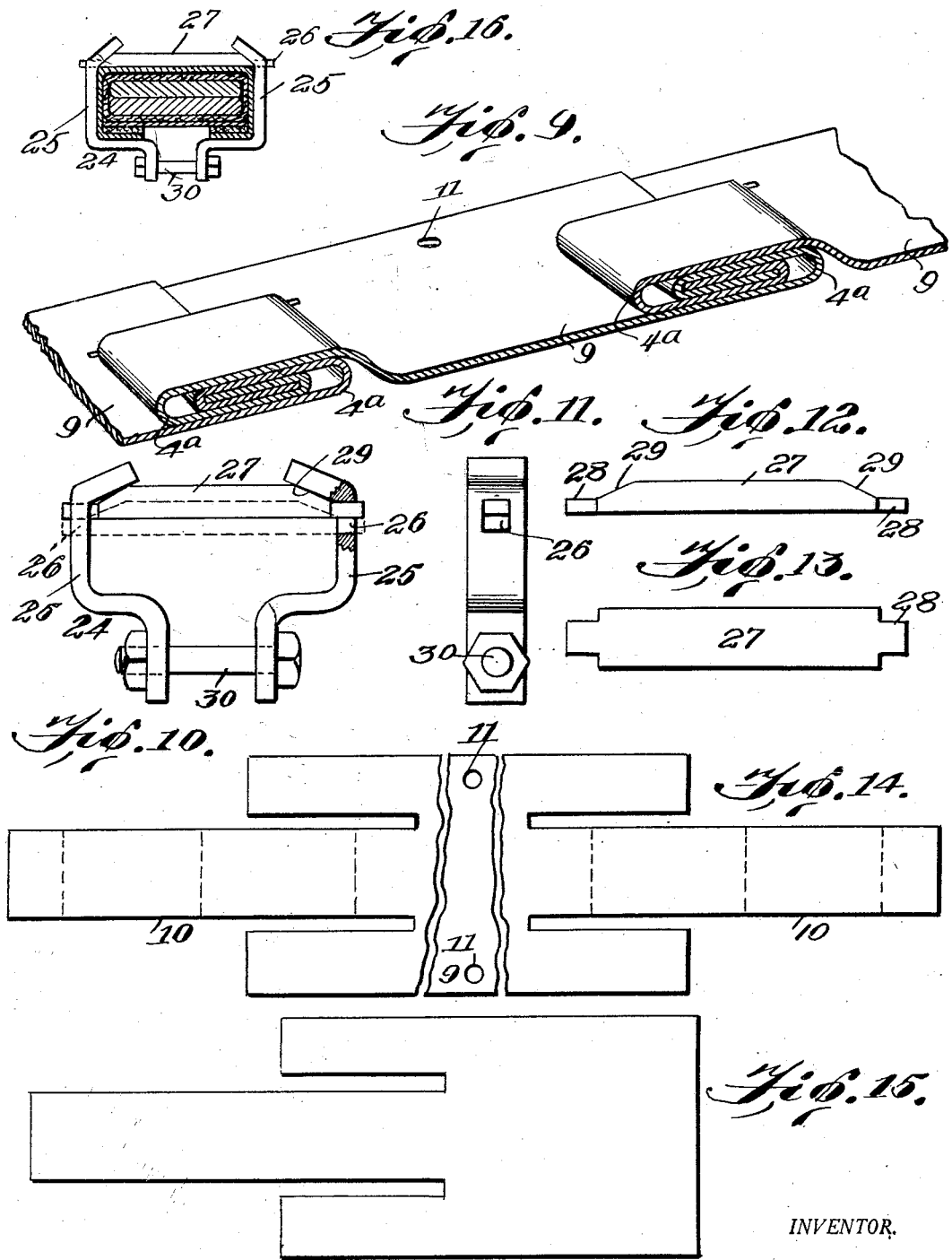
INVENTOR.
BY E. F. Hartzell.
his ATTORNEYS.

Aug. 23, 1927.
E. F. HARTZELL
1,639,942
SPRING COVER, SPRING SLEEVE, AND LUBRICATOR
Filed Oct. 18, 1926
4 Sheets-Sheet 4
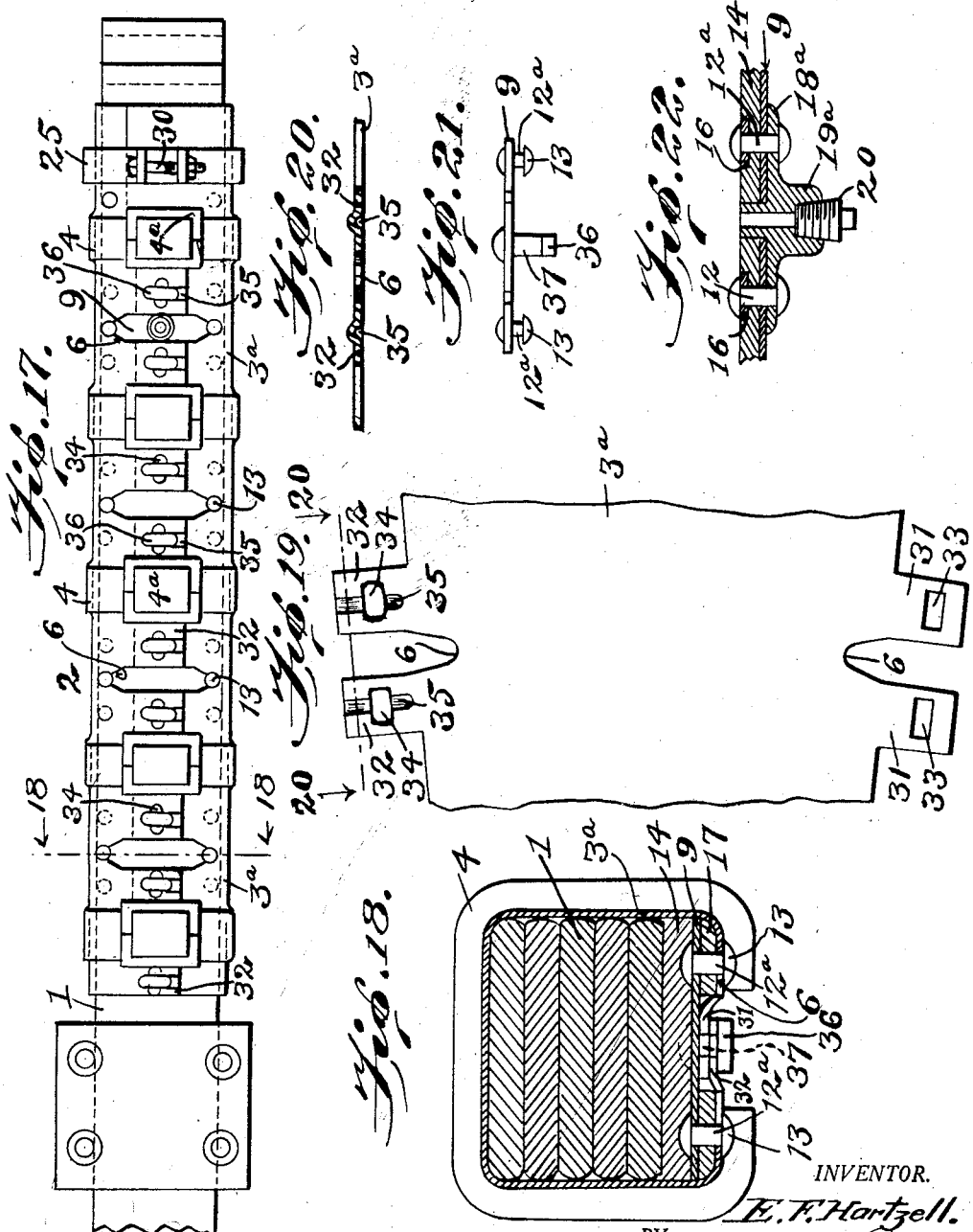
INVENTOR.
E. F. Hartzell.
BY
ATTORNEYS.

Patented Aug. 23, 1927.

1,639,942

UNITED STATES PATENT OFFICE.

EARL F. HARTZELL, OF CUYAHOGA FALLS, OHIO.

SPRING COVER, SPRING SLEEVE, AND LUBRICATOR.

Application filed October 18, 1926. Serial No. 142,346.

This invention relates to a spring cover, spring sleeve and lubricator for use on the springs of motor vehicles.

The object of the invention is the production of an efficient, durable and easily applied metallic cover and lubricating apparatus for the springs of a motor vehicle, such as an automobile.

Another object of the invention is the production of a sectional cover or casing for a motor vehicle spring, which is dust and dirt proof, and which easily accommodates itself to the movement of the spring without impairing its efficiency or limiting its period of service.

A still further object of the invention is the production of a jointed or sectional casing, the sections of which have a decided longitudinal movement yet are sealed so efficiently that a considerable pound pressure can be exerted interiorly of the casing without any leak occurring, which also insures against any foreign substance entering the casing from the outside.

With the foregoing and other objects in view, my invention comprises certain novel constructions, combinations and arrangements of parts as will be hereinafter fully described, illustrated in the accompanying drawings and more particularly pointed out in the appended claims.

In the drawings:

Figure 1 is a top plan view of an apparatus constructed in accordance with the present invention.

Figure 2 is a view in side elevation of an apparatus constructed in accordance with the present invention.

Figure 3 is a bottom plan view of an apparatus constructed in accordance with the present invention.

Figure 4 is a sectional view taken on line 4—4, Figure 3, looking in the direction of the arrows.

Figure 5 is a sectional view taken on line 5—5, Figure 3, and looking in the direction of the arrows.

Figure 6 is a sectional view taken on line 6—6, Figure 3, looking in the direction of the arrows.

Figure 7 is a sectional view taken on line 7—7, Figure 2, looking in the direction of the arrows.

Figure 8 is a fragmentary, perspective sectional view of the filler device.

Figure 9 is an enlarged fragmentary, perspective, sectional view of the filler device.

Figure 10 is an end view in elevation of the clamp device, while

Figure 11 is a side view of the same.

Figure 12 is a side view of the plate of the clamp device, while

Figure 13 is a top plan view of the same.

Figure 14 is a top plan view of a blank of one of the central metallic sections of the filler device prior to folding.

Figure 15 is a plan view of the blank of the outer section of the filler device.

Figure 16 is a sectional view taken on line 16—16, Figure 2, and looking in the direction of the arrows.

Figure 17 is a bottom plan view of another embodiment of my apparatus.

Figure 18 is a sectional view taken on line 18—18, Figure 17, looking in the direction of the arrows.

Figure 19 is a fragmentary view of a blank from which the sections of the casing shown in Figure 17 are formed.

Figure 20 is a sectional view taken on line 20—20, Figure 19, looking in the direction of the arrows.

Figure 21 is an end view of one of the sections of the filler device.

Figure 22 is an enlarged fragmentary sectional view of the filler device, showing another embodiment of the means for supplying lubricant to the casing.

Referring to the drawings by numerals, 1 designates the laminated spring upon which is mounted my apparatus 2. This apparatus comprises a casing or cover composed of sections 3. The ends of the sections are provided with a double folded seam 4 (Fig. 7) of sufficient size to allow considerable longitudinal movement at the inner fold of each flanged end, as shown by dotted lines A. This peculiar double fold of the interlocking flanged edges of the sections produces a very efficient structure, because an absolutely tight seal is formed, since I have found by actual experience that subjecting the interior of the apparatus to a severe water test, no leak will occur at the jointed edges of the sections constituted by said double fold of the interlocking flanged edges. The casing 2 is made out of any suitable malleable or bendable sheet metal with the sections and their double seamed or flanged edges placed together while the sections of the casing are in a substantially flat position, then the entire casing may be bent or otherwise "formed" around the spring, during the assembling of the apparatus on the motor vehicle.

On the longitudinal edges of the middle sections are formed eyes 5 and also substantially V-shaped notches 6.

The filler device of the apparatus comprises a plurality of central metallic sections 9 that have tongues 10 extending from their ends. These tongues of sections 9 (Fig. 14) are folded to produce double folded flanges or seams 4ᵃ similar in structure to the double fold or interlocking flanged edges 4, as shown in Figure 7, because the sections of the filler device must have corresponding longitudinal movement with the sections of the cover. Each section 9 is provided with rivet apertures 11 (Fig. 14) through which extend rivets 12, which rivets have heads 13 that engage the V-shaped notches 6 when the sectional casing is assembled with the filler (Fig. 3). A strip of comparatively thick felt 14 is laid upon the sections 9 (Figs. 9, 14 and 15) with washers 15 in sockets 16 (Fig. 8) and the rivets 12 extending through said washers 15 tightly fastening the felt strip 14 to the metallic sections of the filler device. Auxiliary strips of felt 17 are laid against the under face of metallic sections 9 and are held securely in position by said rivets 12 (Figs. 4 and 5). A small metal plate 18 is embedded (Figs. 5 and 8) in the felt strip 14 and integral therewith is an interiorly threaded tit or tube 19, with plug 20, closing its outer end, whereby a suitable lubricant can be forced into the apparatus against and around the spring.

In assembling the apparatus on the spring, the sectional casing is bent around the spring, then the filler device is placed against the bottom of the spring, and the longitudinal edges of the casing are bent or forced against the bottom of the filler device, causing the rivets to move into the V-shaped notches 6, until the outer heads of the rivets act as a lock, engaging the outer face of the edges of the bottom portion of the casing, as clearly shown in Figure 3; when in this position, the eyes 5 will be registering, whereupon rod 21 can be threaded through said registering eyes 5, and fastened thereon, by reason of the outer hooked end 22 and the cotter pin 23 through its inner end. By removing the cotter pin 23 and exerting pressure on the outer hooked end 22, the rod can quickly be removed. It will be noted that the eyes 5 are sufficiently spaced apart on rod 21 to allow the longitudinal movement of the sections when there is vertical movement of the spring.

To efficiently seal or close the outer end of the apparatus, I place felt or other suitable material entirely around the spring (Fig. 16) and clamp this end by means of a clamp device 24. This clamp device 24 comprises a pair of jaws 25 having elongated apertures 26, and a bar 27 with reduced ends 28 working upon the jaws. The bar 27 is bevelled at 29, so that as the bolt 30 is tightened, the plate or bar 27 will more tightly clamp the casing and felt, thereby forming a more perfect seal or closure for the outer end of the apparatus. It will, therefore, be seen that I have provided adjustable clamping means on the outer end of a spring cover or sleeve for tightly clamping the same around the spring, and thereby forming a tight seal to prevent lubricant contained within the apparatus from spilling or being forced out of the same, and also at the same time preventing any foreign substance such as dust, mud or water from entering the apparatus.

Referring to the embodiment shown in Figures 17 to 22: The sections 3ᵃ are provided with overlapping tongues 31 and 32. In tongues 31 are transversely positioned elongated apertures 33 which register with similarly positioned apertures 34 in tongues 32. Extending longitudinally of tongues 32 are depressions 35 in which the elongated heads 36 of locking pins 37 are normally seated. These locking pins 37 are rotatably mounted upon sections 9 of the filler device and in assembling the casing, constituted by sections 3ᵃ, the overlapping tongues 31 and 32 are brought together as shown in Figure 17, whereupon apertures 33 and 34 are registering, allowing the elongated heads 36 and locking pins 37 to extend through and be turned at right angles to the apertures, so as to allow the heads to "snap" or be seated in the locking depressions 35. By this novel and simple fastening means, I eliminate the eyes 5 and locking rod 21 as shown in the embodiment depicted in Figure 3.

The rivets 12ᵃ are normally in the substantially V-shaped notches 6, performing the same function as rivets 12 in Figure 3.

In Figure 22, the means for injecting lubricant into the casing comprises a plate portion 18ᵃ with an apertured extension 19ᵃ closed by threaded plug 20. This means is similar to the device disclosed in Figures 5 and 8.

My apparatus will conform to the different positions of the spring in service and will provide against leakage or fracture of the apparatus in any position after same has been applied to the spring.

The filler device of my apparatus provides for any variation in depths of springs, and the felt 14 provides a storage reservoir of the lubricant.

It will be noted that there is sufficient "springy" or resilient action in the felt strips 14 and 17 to permit rivets 12 to be forced into the sockets or notches 6 of the sectional casing and hold this position substantially independent of the locking action of the rod 21 in eyes 5. Further, these rivets 12 in notches 6 "center" the metallic sections 9 of the filler device to a nicety.

From the foregoing description, it will be apparent that I have produced an apparatus for covering and lubricating a spring which comprises sections having double or multiple flanges at their contiguous ends, the flanges each being of sufficient size to allow double end movement of a longitudinal nature with respect to the spring upon which the apparatus is mounted, while at the same time forming a perfectly tight joint and also practically an indestructible joint or seam.

While I have described the preferred embodiments of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In an apparatus of the class described, the combination of a sectional casing, said sections provided with double flanges at their contiguous ends, said flanges each being of sufficient size to allow double end movement of a longitudinal nature with respect to a spring upon which the apparatus may be mounted, a filler device assembled with said sectional casing, said filler device comprising sections capable of longitudinal movement, and means for fastening said sectional casing and filler device together.

2. In an apparatus of the class described, the combination of a casing comprising sections, said sections provided at their ends with interlocking double flanges, and a filler device assembled with said casing.

3. In an apparatus of the class described, the combination of a casing comprising sections, said sections provided at their ends with interlocking double flanges having room at the ends of each set of interlocking flanges for allowing sliding movement, and a filler device assembled with said casing.

4. In an apparatus of the class described, the combination of a casing comprising sections, said sections provided at their contiguous ends with double interlocking flanges having room at opposite ends of each flange to allow longitudinal movement of the sections of the casing, and a filler device assembled with said casing.

5. In an apparatus of the class described, the combination of a casing, and a filler device comprising sections capable of longitudinal movement with respect to said casing.

6. In an apparatus of the class described, the combination of a casing provided with eyes and notches, a filler device provided with locking means adapted to be seated in said notches, and means extending through said eyes for positively holding the casing in an assembled position upon said filler device.

7. In an apparatus of the class described, the combination of a casing provided with eyes and substantially V-shaped notches, a filler device provided with rivets adapted to be placed in said V-shaped notches, and a rod extending through said eyes.

8. In an apparatus of the class described, the combination of a filler device provided on its under face with headed means, a casing folded upon said filler device and having edges under said headed means, and additional fastening means along the edges of said casing for securely fastening it upon said filler device.

9. In an apparatus of the class described, the combination of a filler device provided with casing fastening means, a casing engaging said filler device and said fastening means, and additional detachable fastening means on said casing.

10. In an apparatus of the class described, the combination of a filler device provided with casing fastening means, a casing on said filler device and engaging said fastening means, said casing provided with slidable lock receiving means, and a slidable lock means within said receiving means.

11. In an apparatus of the class described, the combination of a filler device normally against the bottom of a spring, a casing engaging the bottom of said filler device, said filler device and casing provided with locking means, and said casing provided with an auxiliary locking means independent of said filler device.

12. In an apparatus of the class described, the combination of a filler device, said filler device provided with fastening means on its bottom face, a casing partly around said filler device and having portions engaging said fastening means, and additional fastening means independent of the filler device and co-operating with said casing for fastening the casing securely upon the filler device.

13. In an apparatus of the class described, the combination of a filler device provided on its bottom with outstanding fastening means, a casing bent around the edges of said filler device and having part of its edges under said outstanding fastening means, said casing provided on its edges with slidable-lock receiving means, and slidable locking means in said receiving means.

14. In an apparatus of the class described, the combination of a sectional casing having interlocking flanged ends, a sectional filler device having interlocking flanged ends, said flanged ends of the filler device and casing adapted to have similar longitudinal movement, and means for fastening the casing upon said filler device.

15. In an apparatus of the class described, the combination of a casing comprising a plurality of sections, said sections provided at their contiguous or meeting ends with means for considerable longitudinal movement of the sections, and a filler device within the sides of said casing and provided with means for longitudinal movement corresponding with the sections of said casing.

16. In an apparatus of the class described, the combination of a filler device, a casing engaging said filler device, said filler device provided with locking means engaging edges of the casing, said casing provided with lock-receiving means independent of the filler device, and lock means in said locking-receiving means.

17. In an apparatus of the class described, the combination of a filler device comprising sections, a felt strip of the same width as said sections and laid upon the top of the same, auxiliary strips of felt against the bottom of said section, means fastening said sections and strips of felt together, a casing mounted upon said filler device, and means for fastening said filler device and casing together.

18. In an apparatus of the class described, the combination of a filler device comprising a metallic unit having yieldable material against the top and bottom, a casing partly enclosing said filler device, and means for fastening said casing upon said filler device.

19. In an apparatus of the class described, the combination of a filler device provided with a yieldable unit, a plate with a tubing embedded in said yieldable unit, and a casing fastened upon said filler device.

20. In an apparatus of the class described, the combination of a filler device comprising a metallic unit with a fabric covering across its top and with fabric strips against its bottom, and a casing upon said filler device and fastened against said fabric strips against the bottom of the metallic unit.

21. In an apparatus of the class described, the combination of a compressable filler device, a casing mounted upon said filler device, detachable fastening means connecting said filler device and casing, and means on the filler device for permitting a lubricant to be supplied to said casing.

22. In an apparatus of the class described, the combination of a longitudinal extensible casing, a longitudinal extensible and compressable filling device within part of said casing and partly closing a portion of the same, and means for supplying a lubricant to said casing.

23. In an apparatus of the class described, the combination of a casing, an extensible and vertically compressable filler device in said casing, and means for supplying a lubricant to said casing.

24. In an apparatus of the class described, the combination of a casing, a filler device in said casing, said filler device including a compressable unit and a non-compressable unit fastened together, and means for fastening said casing and filler device together.

In testimony whereof I hereunto affix my signature.

EARL F. HARTZELL.